April 25, 1961
E. MAURER
2,981,051
SPINDLE BEARING ARRANGEMENT
Filed Feb. 13, 1958
2 Sheets-Sheet 1
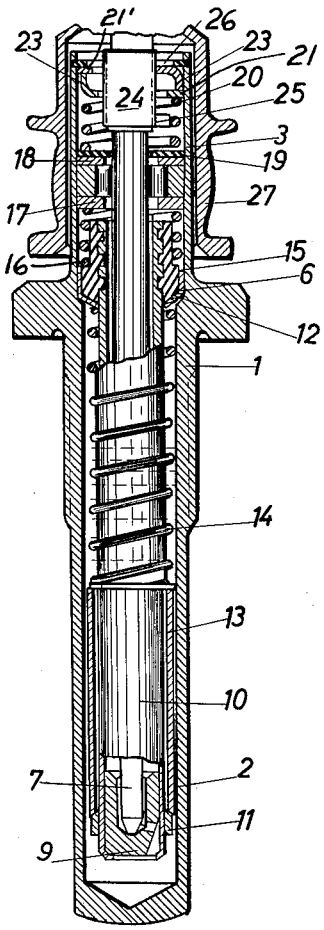
Fig. 1
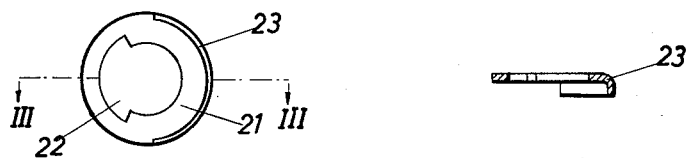
Fig. 2
Fig. 3
Inventor:
Eugen Maurer
by:
Michael S. Striker
Attorney

United States Patent Office 2,981,051
Patented Apr. 25, 1961

2,981,051

SPINDLE BEARING ARRANGEMENT

Eugen Maurer, Panoramaweg 13, Murrhardt, Wurttemberg, Germany

Filed Feb. 13, 1958, Ser. No. 715,080

Claims priority, application Germany Apr. 30, 1957

11 Claims. (Cl. 57—134)

The present invention relates to textile machinery and more particularly to part of a spinning machine.

In particular, the present invention relates to structure for supporting a spinning or yarn spindle of a spinning machine, the present invention being concerned with the details of a bearing for such a spindle.

One of the objects of the present invention is to provide a spindle bearing arrangement which enables the spindle whorl to have the smallest possible diameter while at the same time providing a complete damping of vibrations of the spindle as well as a centering thereof, even in cases where the spindle operates under a large load and in the case of large unbalanced forces created by the yarn cake on the spindle.

Another object of the present invention is to provide a spindle bearing arrangement of the above type which will prevent corrosion of elements of the spindle bearing.

A further object of the present invention is to provide such a spindle bearing arrangement with a means for releasably holding the spindle in a housing, this means being situated in the organization in such a way that foreign matter such as particles of fiber or the like cannot settle on the releasable spindle holding means, and also the spindle holding means, in accordance with the present invention, is made of simple rugged elements which operate in a foolproof manner so that improper handling of the parts of the assembly is prevented.

An additional object of the present invention is to provide a spindle bearing arrangement which includes many elements whose performance characteristics have been proved by years of practical use in the textile industry.

It is also an object of the present invention to provide a spindle bearing arrangement which will be capable of withstanding the hardest use and the most demanding requirements while at the same time having a long life.

With the above objects in view, the present invention includes in a spindle bearing arrangement an elongated hollow housing having an elongated lower interior portion which is of a smaller diameter than an elongated upper interior portion thereof, and this housing has in its interior between its upper and lower interior portions an upwardly directed annular shoulder. A spindle extends substantially coaxially along the interior of this housing in its upper and lower interior portions, and a bearing sleeve is also located within the upper and lower interior portions of the housing and surrounds the spindle with clearance. In accordance with the present invention a means is fixed to this bearing sleeve in the upper interior portion of the housing and engages the shoulder thereof for supporting the bearing sleeve. Above the bearing sleeve in the upper interior portion of the housing is located, in accordance with the present invention, a roller bearing which has an outer race ring fixed immovably with the housing in the upper interior portion thereof as by having a press fit therein, this roller bearing cooperating with the spindle to guide the latter for rotation about its axis. Above the roller bearing there is located within the interior upper portion of the housing a bayonet means for releasably holding the spindle in the housing, and this bayonet means is located in the space between the spindle and the housing wall, and this upper portion of the housing is itself completely surrounded by the spindle whorl.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational sectional view of a spindle bearing arrangement according to the present invention, the section of Fig. 1 being taken in a central plane of the structure;

Fig. 2 shows part of a bayonet means for releasably holding the spindle in its housing;

Fig. 3 is a sectional view taken along line 3—3 of Fig. 2 in the direction of the arrows.

Figure 4:
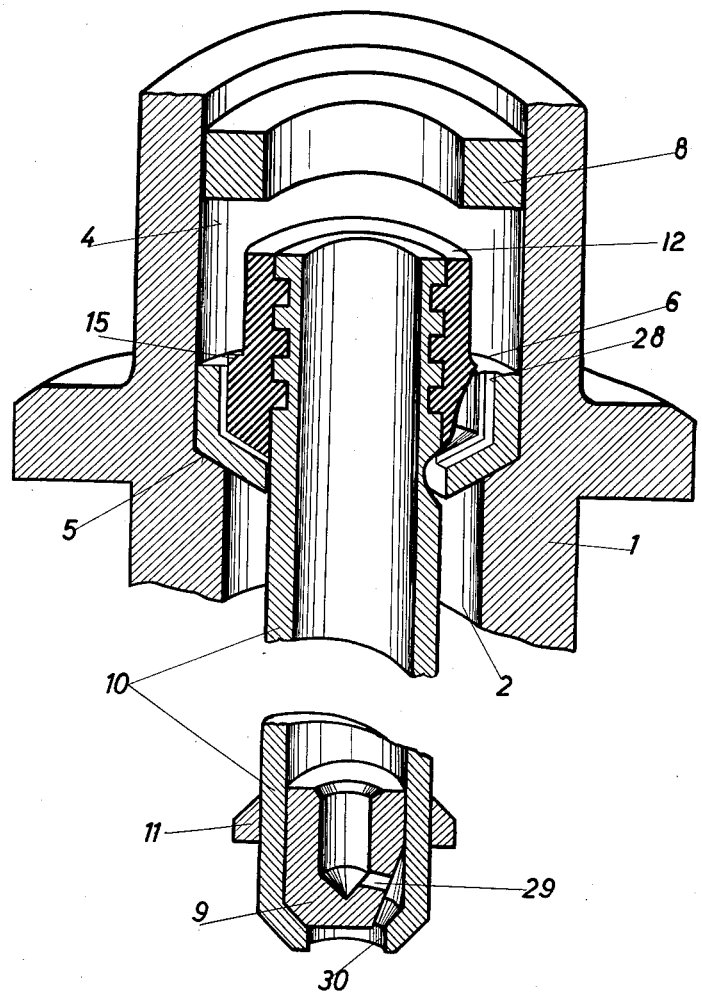
Fig. 4 is a fragmentary sectional elevational view on an enlarged scale, as compared to Fig. 1, of the spindle supporting structure without the spindle therein.

As may be seen from Fig. 1, the spindle bearing arrangement of the present invention includes an elongated tubular housing 1 which extends substantially vertically. Between its ends this housing is provided with an outwardly directed annular flange adapted to rest on a spindle rail in a known way, this spindle rail supporting the housing 1. This spindle housing 1 can conveniently be made by a die-casting or injection holding process, and none of its parts need be machined. The spindle housing 1 is open at its top end and closed at its bottom end, and it has an elongated lower interior portion 2 which is of a smaller diameter than the hollow interior 4 of the upper portion 3 of the housing 1. Between the upper hollow interior portion 4 and the lower hollow interior portion 2 of the housing 1, the latter is provided in its interior with an upwardly directed annular shoulder 5 which is of a frusto-conical configuration.

An annular metal bushing 6 engages the shoulder 5, and this bushing 6 may be made from sheet metal and may be cut and pressed to the desired configuration in a suitable stamping machine with suitable dies. This bushing 6 is formed with axially extending inner grooves 28 (Fig. 4) which provide a path of flow for oil in a downward direction in the interior of the housing.

An upper portion of the spindle 7 in the interior of the upper portion 3 of the housing 1 is rotatably supported by a roller bearing which has, in accordance with the present invention, an outer race ring 8 which is immovable with respect to the housing 1. It is preferred to provide this immovable connection between the outer race ring 8 and the housing 1 by mounting the race ring 8 in the interior of the housing 1 with a press fit.

A thrust bearing 9 of known construction engages the bottom end of the spindle 7 to support the latter for rotation at its bottom end, and this thrust bearing 9 is carried by the lower end of an elongated hollow tubular bearing sleeve 10 which surrounds the spindle 7 and which is located within the hollow interior of the portion 4 and the hollow interior of the portion 2 of the housing 1. The bearing sleeve 10 carries at a portion thereof which surrounds the thrust bearing 9 a brake ring 11 having a top face which has the configuration of an annular surface which forms part of a cone, and the crest of this cone is located at a higher elevation than the brake ring 11, as is apparent from Figs. 1 and 4.

At its upper end portion which is located within the upper inner portion 4 of the housing 1, the bearing sleeve 10 fixedly carries a bearing head 12 which may be made of a corrosion-resistant metal such as zinc or which may be made of a resin having good sliding and wearing properties such as, for example, a polyamid or the like. This bearing head 12 is in the form of a sleeve having a lower frusto-conical annular end face forming part of a cone whose apex is located below the bearing head 12. Also, this lower face of the bearing head 12 may form part of a sphere, if desired. The bearing head 12 is fixed immovably with the bearing sleeve 10 as by portions of the bearing head 12 which extend into annular external grooves formed at the upper portion of the bearing sleeve 10, as indicated in Fig. 1. Bearing head 12 may be molded directly on bearing sleeve 10.

It will be noted that direct contact between the bearing head 12 and the shoulder 5 is prevented by the bushing 6 which surrounds and engages the exterior surface of the bearing head 12, and it is this bushing 6 which directly engages the shoulder 5. In this way the bearing sleeve 10 is supported within the housing through cooperation of bearing head 12 and bushing 6 with the shoulder 5, and this bushing 6 has a press fit in the housing 1. With this arrangement the bearing sleeve 10, which extends with clearance through bushing 6, is mounted within the housing 1 with some degree of free swinging movement in all directions in a manner similar to a pendulum.

The lower portion of the bearing sleeve 10 is surrounded by a damping sleeve 13 which has an outer surface of a diameter of such a size that there is formed between the sleeve 13 and the inner surface of the housing 1 at the lower interior portion 2 thereof a gap in which oil is located by capillary action, and the oil in this gap absorbs relatively small vibrations of the spindle. The bottom end face of the damping sleeve 13 is of an annular frusto-conical configuration which mates with the upper face of the brake ring 11 so as to cooperate therewith for absorbing larger vibrations of the spindle. For this purpose there is provided between the bearing sleeve 10 and the damping sleeve 13 a clearance which permits the required movement of the brake ring 11 relative to the damping sleeve 13.

A spring means urges the damping sleeve 13 downwardly into engagement with the brake ring 11, and this spring means takes the form of a coil spring 14 coiled about the bearing sleeve 10 above the damping sleeve 13 and acting downwardly on the latter, the upper end of the coil spring 14 bearing against the bottom end of the bushing 6. The force of the spring 14 is such that the damping sleeve 13 is pressed toward and into engagement with the brake ring 11 with a force great enough to provide the necessary absorption of relatively large vibrations.

The bearing head 12 is formed substantially midway between its ends with an upwardly directed exterior annular shoulder 15 which is engaged by the bottom end of a coil spring 16 which acts as a spring means for urging a bearing cover ring 17 upwardly against the bottom face of the outer race ring 8 of the roller bearing located above the bearing head 12. The upper bearing cover ring 18 is urged downwardly toward the top face of the roller bearing by a spring means which includes the coil spring 20 and the sealing ring 19 located between the coil spring 20 and the bearing cover ring 18.

The upper end of the coil spring 20 bears against the lower bayonet ring 21 of a bayonet means which releasably holds the spindle 7 in the housing 1. Each of the bayonet rings 21 is formed, as shown particularly in Fig. 2, with an arcuate cutout portion 22 forming an extension of the central opening of each ring 21 through which the spindle 7 passes. Furthermore, at its side opposite from the arcuate cutout portion 22 each ring 21 is provided with an arcuate flange 23 extending away from the plane of the remainder of the bayonet ring 21. A pair of these rings 21 are placed in engagement with each other, as indicated in Fig. 1, so that there are upper and lower bayonet rings 21, and the top end of the spring 20 bears against the lower bayonet ring 21. The upwardly directed flange 23 of the lower bayonet ring 21 extends into engagement with the upper ring 21, and the flange 23 of the upper ring extends downwardly into engagement with the lower ring 21, the flange 23 of the upper ring being shown at the right in Fig. 1, while the flange 23 of the lower ring is shown at the left in Fig. 1. In this way these two bayonet rings 21 cooperate with each other in a complementary manner, and it will be noted that their arcuate cutout portions 22 are offset with respect to each other by an angle of approximately 180° about the axis of the spindle 7 which passes through both of these rings, and furthermore the rings cooperate together to define between themselves a chamber of a predetermined thickness and diameter. The upward movement of the pair of bayonet rings is limited by a snap ring 26 located in an annular groove in the interior of the housing 1 adjacent its upper end, this snap ring 26 engaging the upper ring 21, so that in this way the spring 20 is maintained in compression and serves not only to urge the bearing cover ring 18 downwardly toward the race ring 8, but also to maintain the pair of bayonet rings 21 in engagement with each other.

The spindle 7 is provided with a radial projection 25 which in the example illustrated forms part of a sleeve 24 which is pressed onto the spindle. This radial projection 25 has an axial thickness which is no greater than the axial depth of the chamber formed between the pair of bayonet rings 21, and furthermore, the radial distance of the arcuate edges of the arcuate cutout portions 22 from the axis of the spindle 7 is at least as great as the radial distance of the outer tip of the projection 25 from the spindle 7. Thus, in order to withdraw the spindle 7 from the interior of the housing 1, it is necessary for the operator first to raise the spindle so that the projection 25 passes upwardly through the lower arcuate cutout 22, and then it is necessary for the operator to turn the projection 25 in the interior of the chamber formed by the pair of bayonet rings 21 until the projection 25 is aligned with the arcuate cutout portion 22 of the upper ring 21, and the projection 25 may have a loose or slight friction fit in the interior of the chamber formed by the pair of bayonet rings 21. Thus, it is necessary to raise and simultaneously turn the spindle in order to release the same from the housing, so that in this way the spindle is reliably maintained in the housing and no person who does not know what he is doing can injure the apparatus or remove the spindle in an unauthorized manner.

As is apparent from Fig. 1 the upper portion 3 of the housing 1 is completely surrounded by the spindle whorl 27 which defines with the outer surface of the upper housing portion 3 a relatively small annular space. As a result of this arrangement foreign particles such as fibers and the like cannot have access to the bayonet means 21—25 which releasably holds the spindle in the housing. The bayonet rings 21 need not have any great precision and can be very inexpensively manufactured as by being cut and shaped with suitable dies in a stamping machine from sheet metal. The spindle 7 is of a slightly conical configuration and the sleeve 24 is pressed onto the spindle while the projection 25 may be in the form of a tongue struck from and bent at right angles to the axis of sleeve 24 so as to extend radially from the axis of the spindle 7.

The diameter of the whorl 27 is capable of being made quite small as a result of the immovable mounting of the outer race ring 8 of the roller bearing in the interior of the upper housing portion 3, and in order to compensate for vibrations resulting from passing of the speed of rotation of the spindle through a critical speed the inner surface of the outer race ring 8 may be curved slightly so as to form part of a sphere.

Corrosion of the parts is prevented not only by a suitable choice of corrosion-resistant materials but also by locating those parts which are to be protected against corrosion well into the interior of the housing below the roller bearing which is located above the bearing head 12. In this way the covering of the elements with oil moved upwardly along the interior of the bearing sleeve 10 by the spindle 7 rotating therein is guaranteed, and the grooves 28 of the bushing 6 provide a path for the downward flow of the oil. As was mentioned above further protection against corrosion is provided by a choice of suitable materials for the bearing head 12.

It will be noted that the outer diameter of the bearing hear 12 is smaller than the outer diameter of the outer race ring 8 while at the same time bearing head 12 is capable of providing the pendulum-like support for the bearing sleeve 10, and in this way the magnitude of the inner diameter of the upper housing portion 3 need only be as great as the diameter required by the race ring 8 in order to provide a press fit therefor in the interior of the housing.

In order to maintain the cost of the assembly of the invention low, precision in the manufacture of the parts is required only at a relatively few places. For example, the outer diameter of the race ring 8 must have precise dimensions so as to provide the press fit according to which the race ring 8 need only be axially pressed into the upper portion 3 of the housing 1. However, by pressing the bearing cover rings 17 and 18 toward the race ring 8 with the springs 16 and 20, respectively, these cover rings 17 and 18 need not have precise outer diameters and may fit loosely within the upper housing portion 3.

If a projection such as the projection 25 were located in the gap between the whorl 27 and the upper housing portion 3, then such a projection 25 would act similarly to a centrifugal pump and would create a suction which would draw foreign particles such as fibers or the like into the apparatus. Thus, by locating the projection 25 in the interior of the upper housing portion 3 and providing only smooth cylindrical surfaces of the whorl 27 and the housing portion 3 directed toward each other, such a centrifugal pump type of action is completely avoided and no suction of foreign particles into the housing 1 can take place with the structure of the invention.

A sealing ring 19 is located between spring 20 and the top face of the bearing cover ring 18.

The spindle 7 is long and slender and during the formation of the yarn cake thereon, this cake continually increasing in size, unbalanced forces transmitted to the spindle 7 cause the latter to bend. As a result of the cooperation of the bearing head 12 with the bushing 6, the bearing sleeve 10 is capable of tilting in all directions, and during such tilting the bearing head 12 slides with respect to the stationary bushing 6, so that it is desirable to form the bearing head 12 of a material, such as a polyamid plastic or the like, capable of resisting wear. Thus, when the spindle 7 bends the bottom end of the spindle acts on the thrust bearing 9 so as to tilt the bearing sleeve 10, in this manner the bearing 9 has a predetermined extent of free swinging movement with respect to the bearing 8. With this arrangement the spindle 7 continues to rotate freely, without striking or rubbing against any other element, even though the spindle 7 does bend from time to time during rotation. The spring 14 acts through the sleeve 13 on the brake ring 11 in order to return the sleeve 10 to its center position where its axis coincides with that of the housing 1.

The lower interior portion 2 of the housing 1 is approximately ⅔ full of oil, and this oil enters through opening 30 at the bottom of sleeve 10, and through opening 29 of the foot bearing 9 (Figs. 1 and 4) into the interior of the sleeve 10 to the same height as the oil in the housing 1. As a result of the extremely high speed of rotation of the spindle 7 the oil in the bearing sleeve 10 is pumped upwardly and flows from the top end of the bearing sleeve 10 into the interior portion 4 of the housing 1, and this oil then flows downwardly through grooves 28 back into the bore portion 2. Thus, during operation there is a continuous circulation of oil upwardly through the sleeve 10, and in this way proper lubrication is guaranteed. The oil in the lower bore portion 2 of the housing 1 serves additionally to damp the tilting movements of the sleeve 10.

It will be understood that each of the elements described above, or two or more together, may also find a useful application in other types of spindle bearing arrangements differing from the types described above.

While the invention has been illustrated and described as embodied in spindle bearing arrangements for spinning machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a spindle bearing arrangement, in combination, an elongated hollow housing having an elongated lower interior portion of a smaller diameter than an elongated upper interior portion thereof, and said housing having between said upper and lower interior portions thereof an upwardly directed annular shoulder; a spindle extending substantially coaxially along the interior of said housing in said upper and lower interior portions thereof; an elongated bearing sleeve surrounding said spindle and also located in said upper and lower interior portions of said housing; a bearing head fixed to and surrounding a portion of said bearing sleeve in said upper interior portion of said housing, said bearing head being formed from a non-corroding resin; and a bushing engaging the exterior surface of said bearing head and also engaging said shoulder so that said bearing sleeve is supported through said bushing and bearing head on said shoulder and so that said bearing head is separated from said shoulder by said bushing, said bushing being formed with elongated passages extending substantially parallel to the axis of said spindle for providing a path for a lubricant such as oil or the like which is moved upwardly in said bearing sleeve by the rotation of said spindle therein back down into said housing, said bushing being immovable with respect to said housing so as to prevent rotation of said bearing sleeve with said spindle.

2. In a spindle bearing arrangement, in combination, an elongated hollow housing; a spindle extending substantially coaxial along the interior of said housing; a bearing located in said housing and engaging said spindle for guiding the latter for rotation about its axis, said bearing having an outer race ring fixed immovably to said housing in the interior thereof; a pair of bearing cover rings respectively engaging top and bottom faces of said bearing; and spring means in said housing cooperating with said bearing cover rings for urging the latter toward said bearing faces, respectively.

3. In a spindle bearing arrangement, in combination, an elongated hollow housing; a spindle extending substantially coaxial along the interior of said housing; a bearing located in said housing and engaging said spindle for guiding the latter for rotation about its axis, said bearing having an outer race ring fixed immovably to said housing in the interior thereof; a pair of bearing cover rings respectively engaging top and bottom faces of said bearing; and spring means in said housing cooperating with said bearing cover rings for urging the latter toward said bearing faces, respectively, said spring means being in the form of a pair of coil springs respectively coiled about said spindle above and below said bearing, said coil springs respectively having ends directed toward each other and respectively located adjacent said bearing cover rings for urging the same toward said faces of said bearing, respectively, and means in said housing engaging the ends of said springs distant from said bearing cover rings, respectively, for maintaining said springs compressed.

4. In a spindle bearing arrangement, in combination, an elongated hollow housing; a spindle extending substantially coaxial along the interior of said housing; a spindle whorl surrounding an upper portion of said housing; and bayonet means in said upper portion of said housing which is surrounded by said spindle whorl cooperating with said spindle for releasably retaining the same in said housing, said bayonet means including a pair of complementary cooperating parts located in said upper portion of said housing in the space surrounding said spindle.

5. In a spindle bearing arrangement, in combination, an elongated hollow housing; a spindle extending substantially coaxial along the interior of said housing; a spindle whorl surrounding an upper portion of said housing; and bayonet means in said supper portion of said housing for releasably retaining said spindle in said housing, said bayonet means including a projection extending radially from said spindle and a pair of rings located adjacent each other in said upper portion of said housing; said rings each having an arcuate cutout portion through which said projection is capable of passing, and said arcuate cutout portions of said rings being offset with respect to each other about the axis of said spindle, and the portions of said rings through which said spindle passes and which are respectively formed with said arcuate cutouts being spaced from each other by a distance at least equal to the axial thickness of said projection.

6. In a spindle bearing arrangement, in combination, an elongated hollow housing; a spindle extending substantially coaxial along the interior of said housing; a spindle whorl surrounding an upper portion of said housing, said spindle whorl forming part of a sleeve which is fixed to said spindle; and bayonet means in said upper portion of said housing for releasably retaining said spindle in said housing, said bayonet means including a projection extending radially from said spindle and a pair of rings located adjacent each other in said upper portion of said housing, said rings each having an arcuate cutout portion through which said projection is capable of passing, and said arcuate cutout portions of said rings being offset with respect to each other about the axis of said spindle, and the portions of said rings through which said spindle passes and which are respectively formed with said arcuate cutouts being spaced from each other by a distance at least equal to the axial thickness of said projection.

7. In a spindle bearing arrangement, in combination, an elongated hollow housing; a spindle extending substantially coaxial along the interior of said housing; a spindle whorl surrounding an upper portion of said housing; and bayonet means in said upper portion of said housing for releasably retaining said spindle in said housing, said bayonet means including a projection extending radially from said spindle and a pair of rings located adjacent each other in said upper portion of said housing; said rings each having an arcuate cutout portion through which said projection is capable of passing, and said arcuate cutout portions of said rings being offset with respect to each other about the axis of said spindle, and the portions of said rings through which said spindle passes and which are respectively formed with said arcuate cutouts being spaced from each other by a distance at least equal to the axial thickness of said projection, said rings being arranged one above the other in said housing and the upper one of said rings having at one side a downwardly directed flange engaging the lower of said rings, while the lower one of said rings has at its side opposite from said flange of said upper ring another flange directed upwardly and engaging the upper ring, said flanges maintaining said rings in a relationship to each other which provides between said rings the space which is at least equal in axial length to the axial thickness of said projection.

8. In a spindle bearing arrangement, in combination, an elongated hollow housing; a spindle extending substantially coaxial along the interior of said housing; a spindle whorl surrounding an upper portion of said housing; bayonet means in said upper portion of said housing for releasably retaining said spindle in said housing, said bayonet means including a projection extending radially from said spindle and a pair of rings located adjacent each other in said upper portion of said housing, said rings each having an arcuate cutout portion through which said projection is capable of passing, and said arcuate cutout portions of said rings being offset with respect to each other about the axis of said spindle, and the portions of said rings through which said spindle passes and which are respectively formed with said arcuate cutouts being spaced from each other by a distance at least equal to the axial thickness of said projection, said rings being arranged one above the other in said housing and the upper one of said rings having at one side a downwardly directed flange engaging the lower of said rings, while the lower one of said rings has at its side opposite from said flange of said upper ring another flange directed upwardly and engaging the upper ring, said flanges maintaining said rings in a relationship to each other which provides between said rings the space which is at least equal in axial length to the axial thickness of said projection; spring means in said housing engaging the lower of said rings and urging the same upwardly toward the upper one of said rings; and a snap ring in said housing engaging the upper one of said rings for limiting the upward movement thereof, so that said snap ring and spring means cooperate with each other to maintain said rings in engagement with each other.

9. In a spindle bearing arrangement, in combination, an elongated tubular housing having an elongated lower portion of a smaller diameter than an elongated upper portion in the interior of said housing, and said housing having in its interior an upwardly directed annular shoulder located between said upper and lower interior portions thereof; a spindle extending substantially coaxially along the interior of said housing in said upper and lower portions thereof; a bearing sleeve surrounding said spindle with clearance and also located in said upper and lower interior portions of said housing; means fixed to said bearing sleeve and engaging said shoulder for supporting said bearing sleeve in said housing; a thrust bearing carried by said bearing sleeve at a bottom end portion thereof and engaging the bottom end of said spindle for supporting said spindle for rotation at its bottom end; a roller bearing located in said housing over said bearing sleeve and engaging said spindle for supporting the same for rotation in said upper portion of said housing, said roller bearing having an outer race ring fixed immovably with said housing; a brake ring carried by the exterior of said bearing sleeve in said lower portion of said housing adjacent the bottom end of said bearing sleeve; a damping sleeve surrounding said bearing sleeve and having a bottom end engaging a top end of said brake ring; spring means located in said lower portion of said housing and being in the form of a coil spring surrounding said bearing sleeve and acting downwardly on said damping sleeve for urging the latter toward said brake ring, said coil spring having an upper end bearing against said means which engages said shoulder; a pair of bearing cover rings respectively engaging upper and lower faces of said roller bearing; a coil spring surrounding said spindle, engaging said means engaging said shoulder, and engaging the lower of said bearing cover rings for urging the latter upwardly against said roller bearing; and additional spring means located in said housing over the upper one of said bearing cover rings for urging the latter downwardly against said roller bearing.

10. In a spindle bearing arrangement, in combination, an elongated tubular housing having an elongated lower portion of a smaller diameter than an elongated upper portion in the interior of said housing, and said housing having in its interior an upwardly directed annular shoulder located between said upper and lower interior portions thereof; a spindle extending substantially coaxially along the interior of said housing in said upper and lower portions thereof; a bearing sleeve surrounding said spindle with clearance and also located in said upper and lower interior portions of said housing; means fixed to said bearing sleeve and engaging said shoulder for supporting said bearing sleeve in said housing; a thrust bearing carried by said bearing sleeve at a bottom end portion thereof and engaging the bottom end of said spindle for supporting said spindle for rotation at its bottom end; a roller bearing located in said housing over said bearing sleeve and engaging said spindle for supporting the same for rotation in said upper portion of said housing, said roller bearing having an outer race ring fixed immovably with said housing; a brake ring carried by the exterior of said bearing sleeve in said lower portion of said housing adjacent the bottom end of said bearing sleeve; a damping sleeve surrounding said bearing sleeve and having a bottom end engaging a top end of said brake ring; spring means located in said lower portion of said housing and being in the form of a coil spring surrounding said bearing sleeve and acting downwardly on said damping sleeve for urging the latter toward said brake ring, said coil spring having an upper end bearing against said means which engages said shoulder; a pair of bearing cover rings respectively engaging upper and lower faces of said roller bearing; a coil spring surrounding said spindle, engaging said means engaging said shoulder, and engaging the lower of said bearing cover rings for urging the latter upwardly against said roller bearing; additional spring means located in said housing over the upper one of said bearing cover rings for urging the latter downwardly against said roller bearing; and bayonet means located in an upper portion of said housing and cooperating with said spindle for releasably retaining the latter in said housing, said additional spring means pressing upwardly against a part of said bayonet means, and the upper portion of said housing being completely surrounded by a spindle whorl.

11. In a spindle bearing arrangement, in combination, an elongated tubular housing having an elongated lower portion of a smaller diameter than an elongated upper portion in the interior of the housing, said housing having in its interior an upwardly directed annular shoulder located between said upper and lower interior portions thereof; a spindle extending substantially coaxially along the interior of said housing in said upper and lower portions thereof; a bearing sleeve surrounding said spindle with clearance and also located in said upper and lower interior portions of said housing; a bearing head fixed to a portion of said bearing sleeve in said upper interior portion of said housing, said bearing head being made from non-coroding material; a bushing engaging the exterior surface of said bearing head and also engaging said shoulder so that said bearing sleeve is supported through said bushing and bearing head on said shoulder and so that said bearing head is separated from said shoulder by said bushing; a thrust bearing carried by said bearing sleeve at a bottom end portion thereof and engaging the bottom end of said spindle for supporting said spindle for rotation at its bottom end; a roller bearing located in said housing over said bearing sleeve and engaging said spindle for supporting the same for rotation in said upper portion of said housing, said roller bearing having an outer race ring fixed immovably with said housing; a brake ring carried by the exterior of said bearing sleeve in said lower portion of said housing adjacent the bottom end of said bearing sleeve; a damping sleeve surrounding said bearing sleeve and having a bottom end engaging a top end of said brake ring; spring means located in said lower portion of said housing and being in the form of a coil spring surrounding said bearing sleeve and acting downwardly on said damping sleeve for urging the latter toward said brake ring, said coil spring having an upper end bearing against said bushing which engages said shoulder; a pair of bearing cover rings respectively engaging upper and lower faces of said roller bearing; a coil spring surrounding said spindle, engaging said bearing head engaging said shoulder, and engaging the lower of said bearing cover rings for urging the latter upwardly against said roller bearing; and additional spring means located in said housing over the upper one of said bearing cover rings for urging the latter downwardly against said roller bearing.

References Cited in the file of this patent

UNITED STATES PATENTS

| 2,051,641 | Magrath | Aug. 18, 1936 |
| 2,704,946 | Gray et al. | Mar. 29, 1955 |

FOREIGN PATENTS

| 139,284 | Australia | Mar. 17, 1947 |
| 610,614 | Great Britain | Oct. 19, 1948 |
| 914,594 | Germany | July 8, 1949 |
| 974,112 | France | Dec. 17, 1941 |